(12) United States Patent
Takeuchi

(10) Patent No.: US 7,825,649 B2
(45) Date of Patent: Nov. 2, 2010

(54) SPECIFIC PHASE POSITION DETECTION

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 340 days.

(21) Appl. No.: 11/901,947

(22) Filed: Sep. 19, 2007

(65) Prior Publication Data

US 2008/0068002 A1 Mar. 20, 2008

(30) Foreign Application Priority Data

Sep. 20, 2006 (JP) ............................. 2006-254560

(51) Int. Cl.
*G01R 29/00* (2006.01)
*G01R 25/00* (2006.01)
*G08C 19/16* (2006.01)

(52) U.S. Cl. ............. 324/76.79; 324/76.77; 340/870.25

(58) Field of Classification Search .............. 324/76.79, 324/76.77
See application file for complete search history.

(56) References Cited

U.S. PATENT DOCUMENTS

| | | | | |
|---|---|---|---|---|
| 6,363,795 | B1 * | 4/2002 | Bergqvist et al. | ......... 73/861.77 |
| 6,590,376 | B1 * | 7/2003 | Bammert et al. | ......... 324/76.41 |
| 6,856,477 | B2 * | 2/2005 | Morimoto | ................... 359/824 |
| 7,317,309 | B2 * | 1/2008 | Yamaguchi et al. | ...... 324/76.19 |
| 7,567,632 | B2 * | 7/2009 | Takeuchi | ..................... 375/340 |

FOREIGN PATENT DOCUMENTS

JP  05-217682  8/1993

\* cited by examiner

*Primary Examiner*—Jeff Natalini
(74) *Attorney, Agent, or Firm*—Harness, Dickey & Pierce, P.L.C.

(57) ABSTRACT

The specific phase position detection circuit detects first and second temporal positions which have respective desired phase offsets from an upper peak position and a lower peak position of an analog signal having periodicity. The specific phase position detection circuit then outputs phase signals indicating the detected first and second temporal positions.

3 Claims, 10 Drawing Sheets

Fig.9
| Waveform | | Coefficient |
|---|---|---|
| 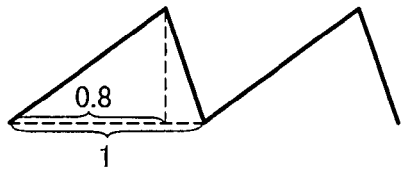 | Sawtooth wave 1 | 0.7 |
| 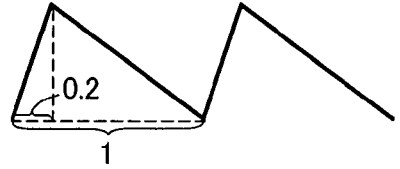 | Sawtooth wave 2 | 0.1 |
| 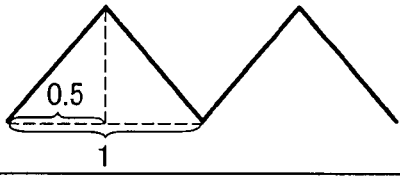 | Triangular wave | 0.4 |
| 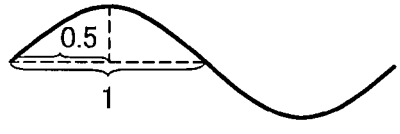 | Sine wave | 0.4 |

SPECIFIC PHASE POSITION DETECTION

CROSS-REFERENCE TO RELATED APPLICATIONS

The present application claims the priority based on Japanese Patent Application No. 2006-254560 filed on Sep. 20, 2006, the disclosure of which is hereby incorporated by reference in its entirety.

BACKGROUND OF THE INVENTION

1. Field of the Invention

This invention relates to technology for detecting the peak position of an analog signal, and in particular relates to technology for accurately detecting the peak position even when the amplitude of the analog signal changes.

2. Description of the Related Art

In recent years, various projectors have been proposed having a resonance circuit made from a coil and a capacitor for lamp control of the discharge lamp. With this kind of projector, the discharge lamp is connected in parallel with the resonance circuit capacitor, and by controlling the frequency of the voltage applied to the resonance circuit to be the resonance frequency of this resonance circuit, applies the necessary voltage for discharge to the discharge lamp connected to the resonance circuit and lights it. Note that as this kind of projector, there is the projector disclosed in JP05-217682A.

With a projector equipped with the resonance circuit for discharge lamp lighting control, there are cases when the resonance frequency of the resonance circuit changes according to changes in the discharge lamp discharge gap friction, the discharge lamp temperature characteristics or the like. In such cases, if the frequency of the voltage applied to the resonance circuit is fixed, it is not possible to apply the necessary voltage to the discharge lamp, and the discharge lamp will not light. In light of this, to maintain the lit state even when the resonance frequency changes, there was a desire to change the frequency of the applied voltage according to changes in the resonance frequency. In response to this kind of demand, proposed was a projector for which the frequency of the voltage applied to the resonance circuit is changed based on the current value of the resonance circuit. Following, we will briefly describe the operation of the lighting control of this kind of projector.

With a constitution with the discharge lamp connected to the resonance circuit, when the frequency of the voltage applied to the resonance circuit is gradually increased and approaches the resonance frequency, discharge starts at the discharge lamp, and a large current flows to the resonance circuit. In this case, the current value of the resonance circuit increases together with the increase of the applied voltage frequency, and becomes the maximum value at the resonance frequency. In light of this, with this projector, the current value at the resonance circuit is detected by a current sensor, and when the detected current value is a specified value or greater, the applied voltage frequency is increased or decreased so as to maintain a specified phase difference between the phase of the resonance circuit current and the phase of the applied voltage. By working in this way, even when the resonance frequency changes, by controlling the applied voltage frequency so as to maintain the state of the current flowing at a specified value or greater to the resonance circuit, it is possible to maintain a stable lighting state.

With this kind of projector, it is necessary to detect the phase difference by comparing the resonance circuit current phase and the applied voltage phase, but this comparison is preferably a comparison of the respective peak level positions (following simply called "peak position"). However, it is difficult to detect the peak positions when the amplitude of the current or the voltage of the resonance circuit is varied.

The problem described above is not limited to the current and the voltage of the resonance circuit, but can also occur when trying to detect the peak positions for analog signals for which the amplitude can change.

SUMMARY OF THE INVENTION

Accordingly, an object of the present invention is to provide technology to accurately detect the peak positions of an analog signal even when the analog signal amplitude changes.

According to an aspect of the present invention, there is provided a specific phase position detection circuit that detect first and second temporal positions which have respective desired phase offsets from an upper peak position and an lower peak position of an analog signal having periodicity, and that outputs a phase signal indicating the detected first and second temporal positions.

With this constitution, even when the amplitude of the analog signal changes, the first specific phase position detection circuit detects the reference positions that has a desired phase offset with the upper peak position and the lower peak position, so it is possible to accurately detect the upper peak position and the lower peak position based on the reference positions. Also, the first specific phase position detection circuit outputs the phase signal, so it is possible to notify the accurate peak position to circuits that perform control based on the peak position.

According to another aspect of the present invention, there is provided a specific phase position detection circuit that detects temporal positions which have a specific phase as specific phase positions for each half cycle of an analog signal. The specific phase position detection circuit comprises: a reference position detection unit configured to detect, as reference positions, temporal positions for which a signal level of the analog signal matches a predetermined threshold value; a first phase detection unit configured to generate a first detection signal indicating a first specific phase position in a first half of each cycle of the analog signal based on the reference positions; a second phase detection unit configured to generate a second detection signal indicating a second specific phase position in a latter half of each cycle of the analog signal based on the reference positions; and a logical operation unit configured to generate a phase signal indicating the first and second specific phase positions by taking logical sum of the first and second detection signals. The first and second phase detection units each includes: a measuring unit configured to measure a length of a reference period based on the reference positions; a calculation unit configured to calculate a partial period which has a fixed ratio in relation to the reference period; and a detection signal generator configured to generate the first or second detection signal indicating the first or second specific phase position based on the reference positions and the partial period.

The peak position is a position with a specified ratio in relation to the reference period. For example, when the analog signal is a sine wave, and the reference period is the time duration between reference positions, the reference period center position (50%) is the peak position. Therefore, with the temporal position determined from the partial period that has a fixed ratio to this reference period, even when the analog signal amplitude changes, the relative position of the temporal position to the peak position is fixed. Because of that, it is possible to accurately detect the peak position based on this temporal position.

According to another aspect of the present invention, there is provided a specific phase position detection circuit that detects temporal positions which have a specific phase as specific phase positions for each half cycle of an analog signal. The specific phase position detection circuit comprises: a reference position detection unit configured to respectively detect, as first and second reference positions, two temporal positions for which a signal level of the analog signal matches a first predetermined threshold value for each cycle of the analog signal; a first phase detection unit configured to generate a first detection signal indicating a first specific phase position in a first half of each cycle of the analog signal based on the first and second reference positions; a second phase detection unit configured to generate a second detection signal indicating a second specific phase position in a latter half of each cycle of the analog signal based on the first and second reference positions; and a logical operation unit configured to generate a phase signal indicating the first and second specific phase positions by taking logical sum of the first and second detection signal. The first and second phase detection units each includes: a measuring unit configured to measure, as a reference period, a length of time from the first reference position to the next second reference position, or a length of time from the second reference position to the next first reference position; a calculation unit configured to calculate a partial period which has a fixed ratio in relation to the reference period measured in the previous cycle for each cycle of the analog signal; and a detection signal generator configured to detect, as the first or second specific phase position, a temporal position offset by the partial period calculated by the calculation unit from the first or second reference position detected in the current cycle, and to generate the first or second detection signal indicating the first or second specific phase position.

When the length of time between the first and second reference positions matching the first threshold value is measured as the reference period for each cycle of the analog signal and the partial period that has a fixed ratio to this reference period is calculated, the temporal position offset by this partial period from the first reference position for the next cycle thereafter is a position near the temporal position offset by the period that is a fixed ratio to the peak position of each cycle, regardless of changes in the analog signal amplitude. In particular, when the change in amplitude of the analog signal is small, and an partial period calculated for a proximate cycle is applied, the temporal position offset by the partial period from the first or second reference position approximately matches the temporal position offset by the period with a fixed ratio to the upper peak position or the lower peak position of each cycle. Therefore, by using the configuration noted above, it is possible to detect as the specific phase position for which the relative position in relation to the peak position is almost fixed for each cycle. As a result, even when the analog signal amplitude changes, it is possible to accurately detect the peak position of this analog signal.

The analog signal may be a signal output from a resonance circuit.

The analog signal that indicates a current value or a voltage value for the resonance circuit can have its amplitude change according to increases and decreases in the frequency of the voltage applied to the resonance circuit. Therefore, according to the present invention, it is possible to accurately detect the peak position of this analog signal even when the amplitude of the analog signal output from the resonance circuit changes. In particular, when the frequency of the applied voltage is increased and approaches the resonance frequency of the resonance circuit, the amplitude of the analog signal is almost fixed, so it is possible to more accurately detect the peak position.

According to another aspect of the present invention, there is provided a waveform generating circuit, equipped with the specific phase position detection circuit in accordance with claim 4, for supplying a voltage waveform signal indicating a voltage waveform to a resonance drive unit that applies a voltage to the resonance circuit. The waveform generating circuit comprises: a waveform generator configured to generate the voltage waveform signal; a position signal output unit configured to receive the voltage waveform signal from the waveform generator, and to detect, as third and fourth reference positions, two temporal positions for which a signal level of the voltage waveform signal matches a second threshold value for each half cycle of the voltage waveform signal, and to output a position signal that indicates the third and fourth reference positions; and a phase comparator configured to receive the phase signal supplied from the specific phase position detection circuit and the position signal supplied from the position signal output unit, and to compare the first and second specific phase positions and the third and fourth reference positions in order to detect a phase difference between the analog signal and the voltage waveform signal, and to output a phase difference signal indicating the phase difference. The waveform generator receives the phase difference signal from the phase comparator, and adjusts a frequency of the voltage waveform signal based on the phase difference indicated by the phase difference signal.

The voltage applied to the resonance circuit by the resonance drive unit has a fixed amplitude regardless of changes in frequency, in contrast to the analog signal of the current or voltage measured for the resonance circuit. Therefore, for the voltage waveform signal, the relative position in relation to the peak position of the third and fourth reference positions matching the second threshold value is fixed for each cycle. Meanwhile, the amplitude of the analog signal changes according to changes in the frequency of the voltage waveform signal; however, with a specific phase position detection circuit for outputting the phase signal output, the relative position of the specific phase position in relation to the peak position is almost fixed with each cycle. Therefore, the phase comparator can compare the phase of a position for the voltage waveform signal and another position of the analog signal each of which has the fixed relative position to the respective peak positions, so it is possible to detect the accurate phase difference. As a result, it is possible to adjust the frequency of the voltage waveform signal based on the accurate phase difference, and to adjust the frequency of the voltage applied to the resonance circuit such that the analog signal maintains a specified level.

According to another aspect of the present invention, there is provided a electronic device equipped with the above waveform generating circuit.

By using this kind of constitution, the electronic device is able to adjust the frequency of the voltage applied to the resonance circuit so that the analog signal maintains a specified level using the waveform generating circuit. Therefore, when the electronic device performs operation control using the resonance circuit, even when there are changes in the resonance frequency due to changes in the operating environment, it is possible to maintain the analog signal at a specified level, making stable operation control possible.

According to another aspect of the present invention, there is provided a discharge lamp control device for controlling lighting of a discharge lamp equipped with the above waveform generating circuit, wherein the discharge lamp is connected to the resonance circuit, and lit by discharge according to voltage applied to the resonance circuit by the resonance drive unit By using this kind of constitution, it is possible to adjust the frequency of the voltage applied to the resonance circuit such that the analog signal maintains a specified level using the waveform generating circuit, so in regards to the discharge lamp that is lit with discharge by the voltage applied to the resonance circuit, even when the resonance frequency changes, it is possible to maintain the lit state.

According to another aspect of the present invention, there is provided a projector comprising the above discharge lamp control device, and a discharge lamp.

By using this kind of constitution, even when the resonance frequency changes due to a change in the gap friction, temperature characteristics or the like with the projector discharge lamp, the discharge lamp lit state is maintained, and it is possible to project and display an image on a screen or the like.

Note that this invention is not limited to the aspects of the device invention such as the specific phase position detection circuit or the like noted above, but can also be realized with aspects as a method invention such as a specific phase position detection method or the like.

BRIEF DESCRIPTION OF THE DRAWINGS

FIG. 9 is an explanatory drawing showing an example of the application signal in variation example 1, the waveform of the signal that is its source, and the coefficient value set for the respective waveforms.

DESCRIPTION OF THE PREFERRED EMBODIMENT

Embodiments are described in the following sequence.
A. Device Constitution
B. Determination of the Phase Detection Point
C. Phase Comparison Operation
D. Variation Examples

A. DEVICE CONSTITUTION

Figure 1:
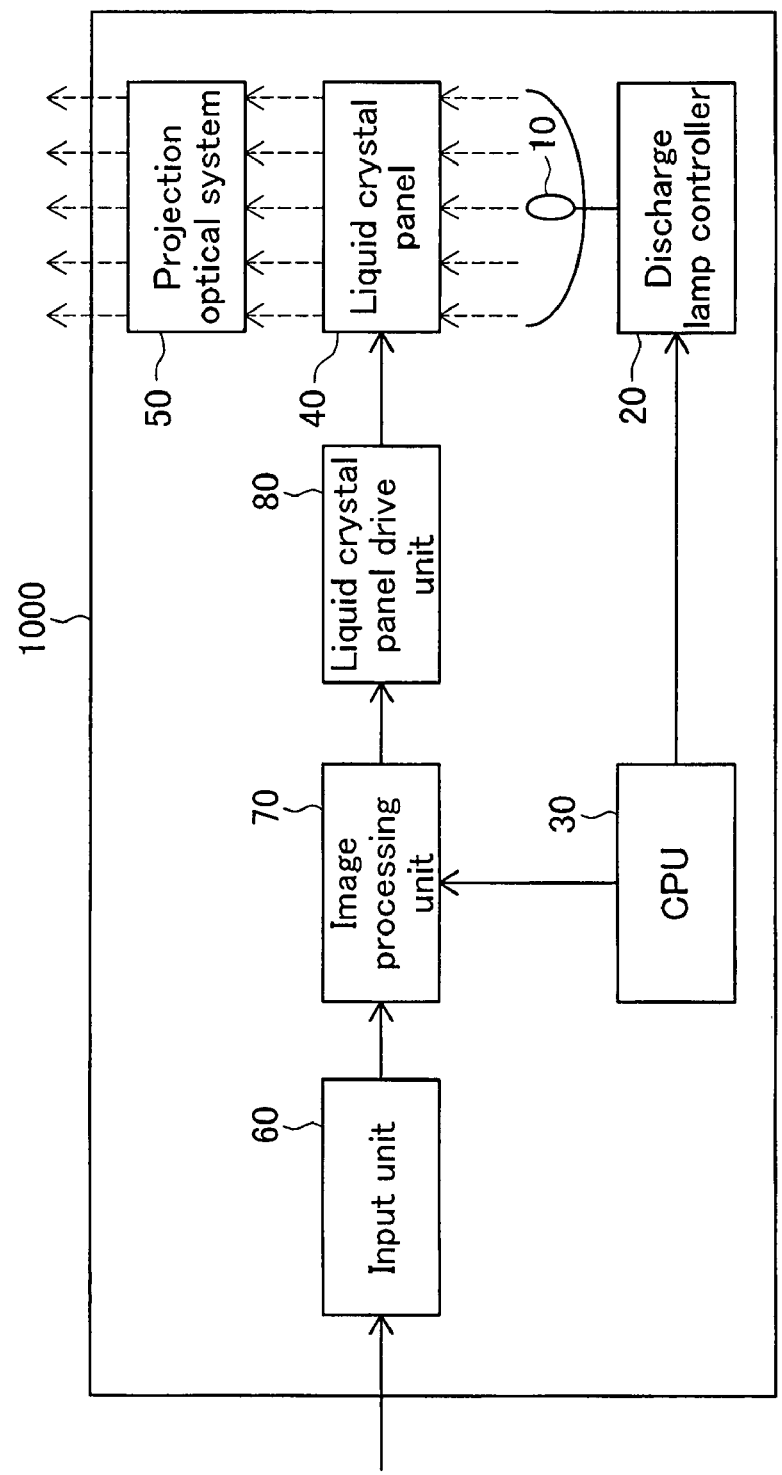
FIG. 1 is an explanatory drawing showing the schematic constitution of a liquid crystal projector as an embodiment of the invention.

FIG. 1 is an explanatory drawing showing the schematic constitution of a liquid crystal projector as an embodiment of the invention. The liquid crystal projector 1000 shown is mainly equipped with a discharge lamp 10, a discharge lamp controller 20 that performs lighting control of the discharge lamp 10, a CPU 30, a liquid crystal panel 40, a projection optical system 50 including a projection lens, an input unit 60 that receives analog signals supplied from an external device, an image processing unit 70, and a liquid crystal panel drive unit 80 that drives the liquid crystal panel 40.

The input unit 60 receives the analog image signals output from a video player, television, personal computer or the like, and converts these to digital image signals. The image processing unit 70 adjusts the input digital image signals such that the image display state (contrast, sharpness and the like) becomes the desired state according to instructions from the CPU 30, and outputs the adjusted image signals to the liquid crystal panel drive unit 80. Then, the liquid crystal panel drive unit 80 drives the liquid crystal panel 40 based on the digital image signal.

The discharge lamp controller 20 lights the discharge lamp 10 according to various parameters set by the CPU 30, and emits illumination from the discharge lamp 10. The liquid crystal panel 40 modulates this illumination according to the image information. The projection optical system 50 projects on to a screen or the like (not illustrated) the illumination modulated by the liquid crystal panel 40, and displays an image. Note that the discharge lamp controller 20 correlates to the discharge lamp control device in the claimed invention.

With this liquid crystal projector 1000, the discharge lamp controller 20 is configured to maintain the lit state of the discharge lamp 10 even if a change occurs in the discharge gap friction or temperature characteristics of the discharge lamp 10.

Figure 2:
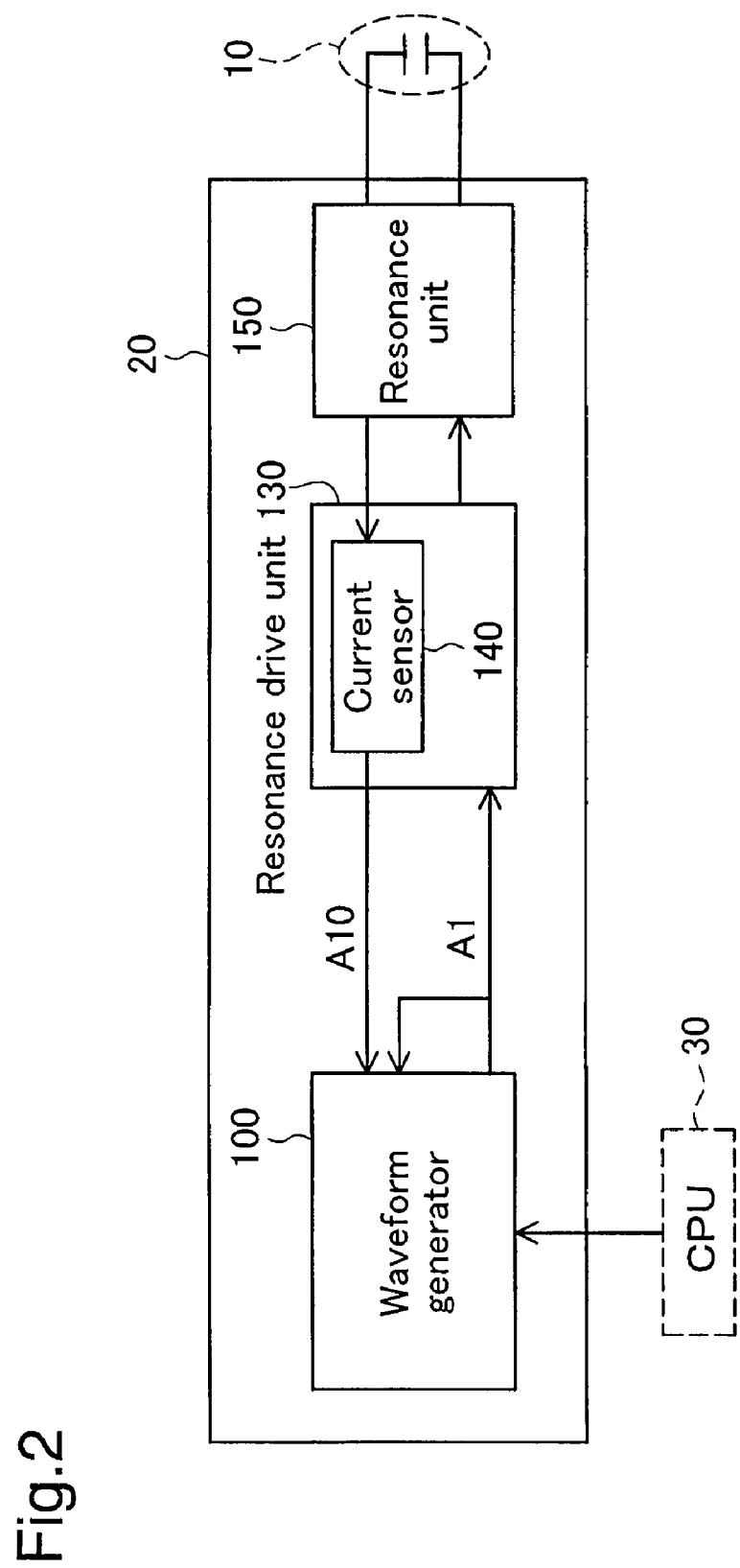
FIG. 2 is an explanatory drawing showing the schematic constitution of the discharge lamp controller shown in FIG. 1.

FIG. 2 is an explanatory drawing showing the schematic constitution of the discharge lamp controller 20 shown in FIG. 1. The discharge lamp controller 20 is mainly equipped with a waveform generator 100, a resonance drive unit 130, and a resonance unit 150.

The resonance unit 150 is equipped with a resonance coil and a resonance capacitor that are not illustrated, and is connected to the discharge lamp 10 so that this resonance capacitor is in parallel connection with the discharge lamp 10. Then, the resonance unit 150 undergoes resonance by the voltage applied from the resonance drive unit 130, whereby the discharge lamp 10 is lit. Based on a sine wave signal A1 output from the waveform generator 100, the resonance drive unit 130 applies a voltage equivalent to this sine wave signal A1 to the resonance unit 150. Then, the current sensor 140 detects the current signal A10 at the resonance unit 150.

The waveform generator 100 generates the sine wave signal A1 based on the parameters set by the CPU 30 and outputs the signal to the resonance drive unit 130. Also, the waveform generator 100 receives the current signal A10 detected by the current sensor 140, and receives the output sine wave signal A1 as feedback. The waveform generator 100 compares the phases of input current signal A10 and the sine wave signal A1 to detect the phase difference, increases or decreases the frequency of the sine wave signal A1 according to this phase difference, and performs control to maintain a specified phase difference. Note that the amplitude of the sine wave signal A1 is maintained while its frequency is changed. The waveform generator 100 correlates to the waveform generating circuit in the claimed invention.

As described above, the waveform generator 100 performs the control such that the resonance drive unit 130 applies a voltage correlating to the sine wave signal A1 to the resonance unit 10, thereby maintaining the voltage applied to the resonance unit 150 and the current at the resonance unit 150 having a specified phase difference, thus maintaining the lit state of the discharge lamp 10. Note that in the following discussions, the specified phase difference described above is set to 0, and the control is performed so as to have the phase of the voltage applied to the resonance unit 150 and the phase of the current at the resonance unit 150 match with each other.

Figure 3:
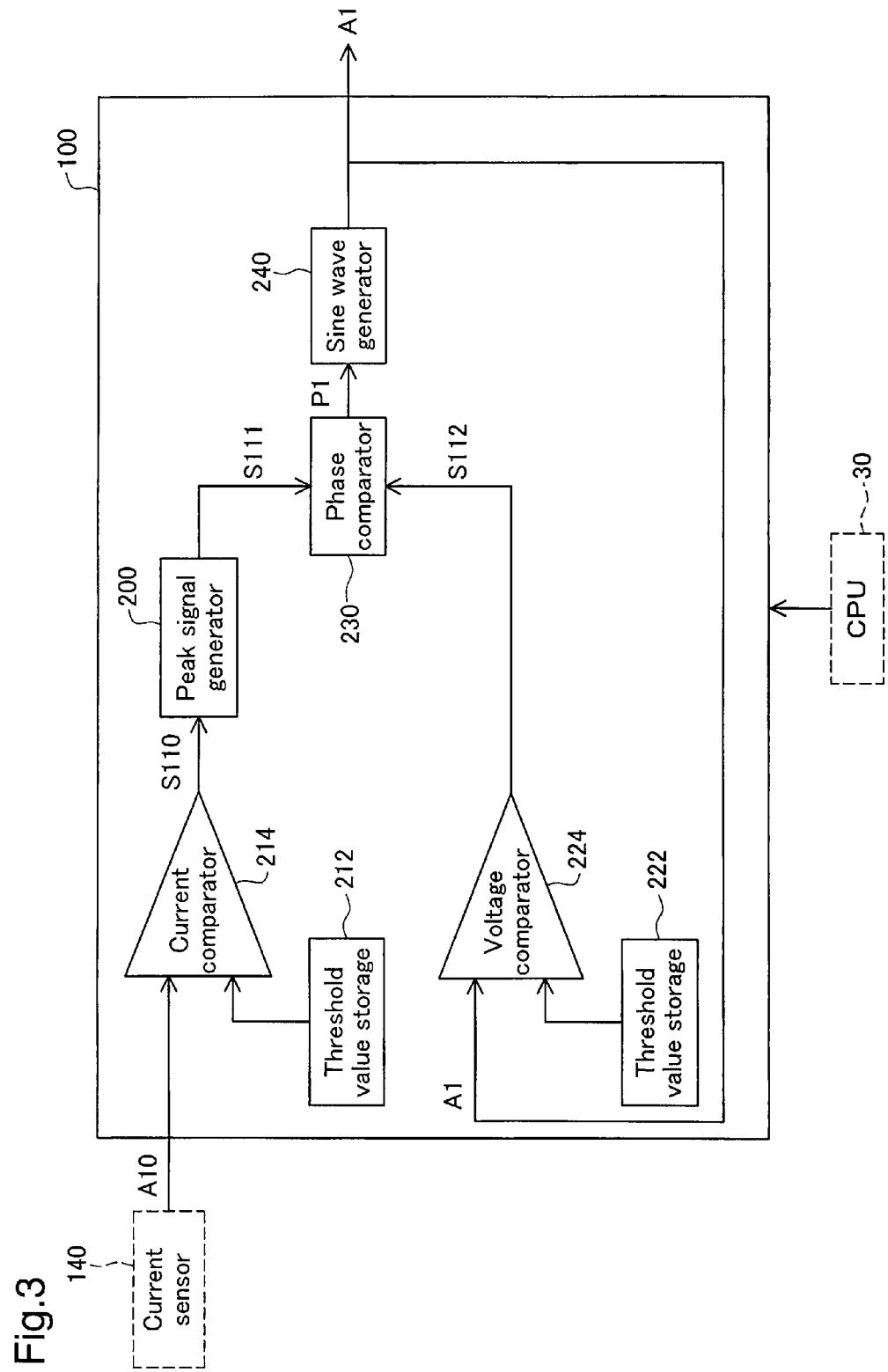
FIG. 3 is an explanatory drawing showing the constitution of the waveform generator shown in FIG. 2.

FIG. 3 is an explanatory drawing showing the constitution of the waveform generator 100 shown in FIG. 2. The waveform generator 100 is equipped with a peak signal generator 200, a threshold value storage 212 and a threshold value storage 222, a current comparator 214, a voltage comparator 224, a phase comparator 230, and a sine wave generator 240.

The threshold value storages 212 and 222 respectively store the threshold values Th3 and Th4 set by the CPU 30. These threshold values Th3 and Th4 are respectively the threshold values for the current signal A10 and the sine wave signal A1.

The current comparator 214 performs a comparison of the threshold value Th3 stored in the threshold storage 212 and the current signal A10 input from the current sensor 140, and when the current signal A10 is equal to or greater than the threshold value Th3, the comparator 214 outputs a high level comparison signal S110. Then, the peak signal generator 200 generates a peak signal S111 that substantially shows both the upper peak position and the lower peak position of the current signal A10 based on the comparison signal S110, and outputs the peak signal S111 to the phase comparator 230. The details of generating this peak signal S111 are described later.

The voltage comparator 224 performs a comparison of the threshold value Th4 stored in the threshold value comparator 222 and the sine wave signal A1 given as feedback from the sine wave generator 240, and when the sine wave signal A1 is equal to or greater than the threshold value Th4, the comparator 224 generates a high level comparison signal S112, and outputs the signal to the phase comparator 230. Here, the amplitude of the sine wave signal A1 output from the sine wave generator 240 is fixed. So with the output of the voltage comparator 224, it is not necessary to perform the peak detection as in the peak signal generator 200. However, as described previously, the peak signal S111 generated by the peak signal generator 200 substantially shows both the upper peak position and the lower peak position of the current signal A10. Therefore, the comparison signal S112 generated by the voltage comparator 224 is also preferably a signal indicating both the upper peak position and the lower peak position of the sine wave signal A1. Because of this, the threshold value storage 222 may alternately supply the positive threshold value Th4 and the negative threshold value –Th4 to the voltage comparator 224 for each half cycle of the sine wave signal A1. Alternatively, it is also possible to provide two voltage comparators 224, to compare the positive threshold value Th4 and the sine wave signal A1 at the first voltage comparator, and to compare the negative threshold value –Th4 and the sine wave signal A1 at the second voltage comparator. In the latter case, by taking the logical sum of these two comparison signals, it is possible to generate the comparison signal S112 to be supplied to the phase comparator 230.

The phase comparator 230 compares the phase detection point (or the peak position) of the current signal A10 and that of the sine wave signal A1 based on the input peak signal S111 and the comparison signal S112, and detects the phase difference of the current signal A10 and the sine wave signal A1.

Then, the phase comparator 230 outputs the phase difference signal P1 indicating this phase difference to the sine wave generator 240. The sine wave generator 240 generates the sine wave signal A1 and also adjusts the frequency of the sine wave signal A1 so as to reduce the phase difference of the current signal A10 and the sine wave signal A1 according to the phase difference signal P1.

The waveform generator 100 operates so as to eliminate the phase difference of the current signal A10 and the sine wave signal A1 by repeatedly performing this kind of phase difference detection and sine wave signal A1 frequency adjustment. Therefore, it is necessary to accurately detect this phase difference, and with this embodiment, by using the peak signal generator 200 described previously, the accurate phase difference is detected.

Note that the peak signal generator 200 correlates to the specific phase position detection circuit in the claimed invention, the voltage comparator 224 correlates to the position signal output unit, the phase comparator 230 correlates to the phase comparator, and the sine wave generator 240 correlates to the waveform generator.

Figure 4:
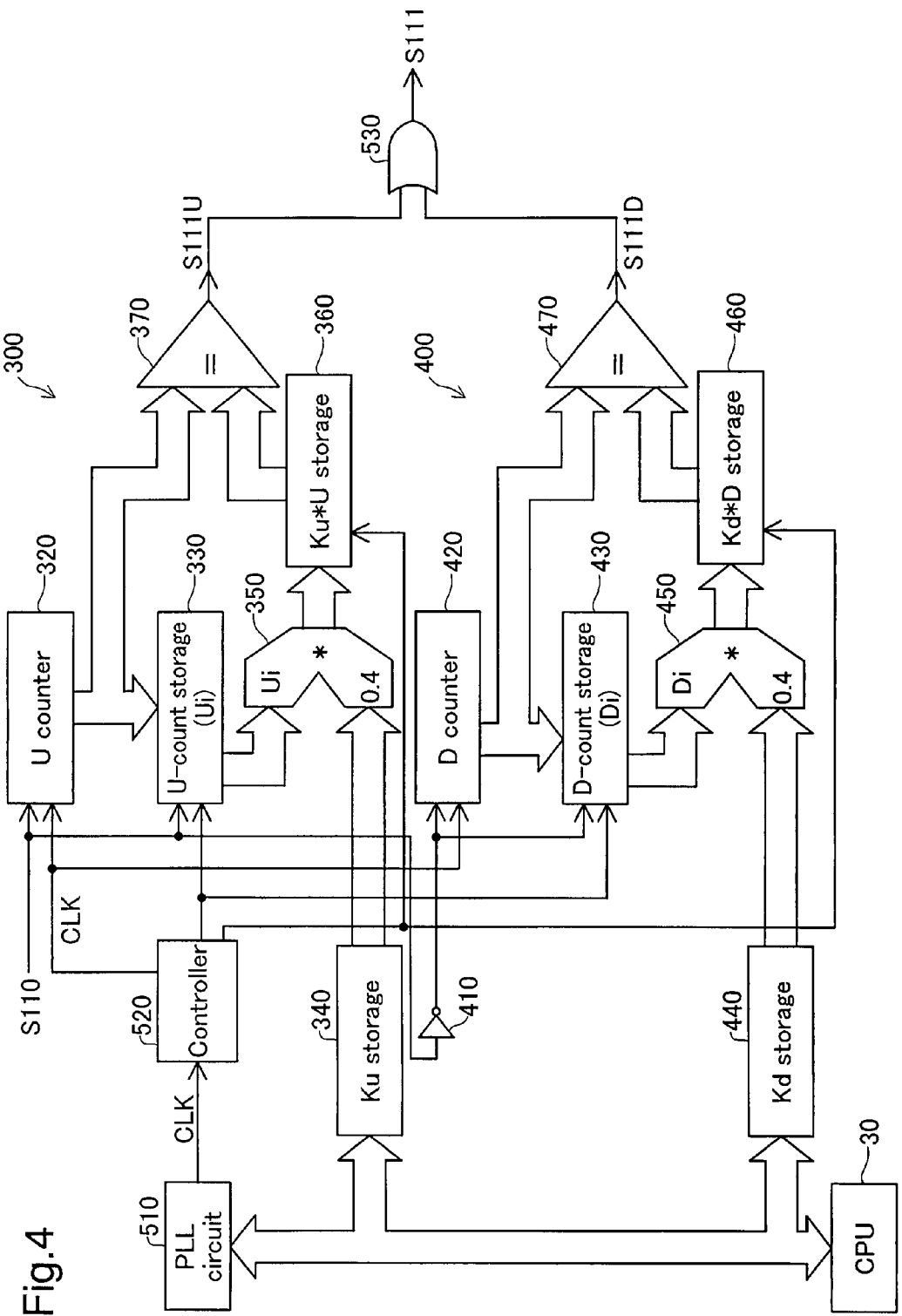
FIG. 4 is an explanatory drawing showing the detailed constitution of the peak signal generator shown in FIG. 3.

FIG. 4 is an explanatory drawing showing the detailed constitution of the peak signal generator 200 shown in FIG. 3. The peak signal generator 200 is equipped with an upper peak position detection unit 300, a lower peak position detection unit 400, a PLL circuit 510, a controller 520, and an OR circuit 530. The upper peak position detection unit 300 is equipped with a counter 320, a counter value storage 330, a coefficient value storage 340, a multiplication circuit 350, an operation result storage 360, and a comparator 370. The lower peak position detection unit is equipped with an inverter (NOT circuit) 410, a counter 420, a counter value storage 430, a coefficient value storage 440, a multiplication circuit 450, an operation result storage 460, and a comparator 470. The lower peak position detection unit 400 can be understood as having a constitution for which the inverter 410 is added to the upper peak position detection unit 300. This inverter 410 is for inverting the comparison signal S110 (FIG. 3), and supplying it to the counter 420. The elements of the upper peak position detection unit 300 and the corresponding elements of the lower peak position detection unit 400 have the same respective functions. The PLL circuit 510 functions as a clock signal generator that generates the clock signal CLK used within the peak signal generator 200. The controller 520 supplies this clock signal CLK to the counters 320 and 420, and also supplies a suitable hold timing (latch timing) to the counter value storages 330 and 430 or the operation result storages 360 and 460. The upper peak position detection unit 300 generates a first detection signal S111U (also called the "upper peak signal") substantially indicating the upper peak position of the current signal A10. The lower peak position detection unit 400 generates a second detection signal S111D (also called the "lower peak signal") substantially indicating the lower peak position of the current signal A10. The OR circuit generates the final peak signal (also called the "phase signal") S111 by taking the logical sum of these two detection signals S111U and S111D. The operation of the upper peak position detection unit 300 and the lower peak position detection unit 400 are almost the same, so the operation of the upper peak position detection unit will be mainly described below.

Figure 5:
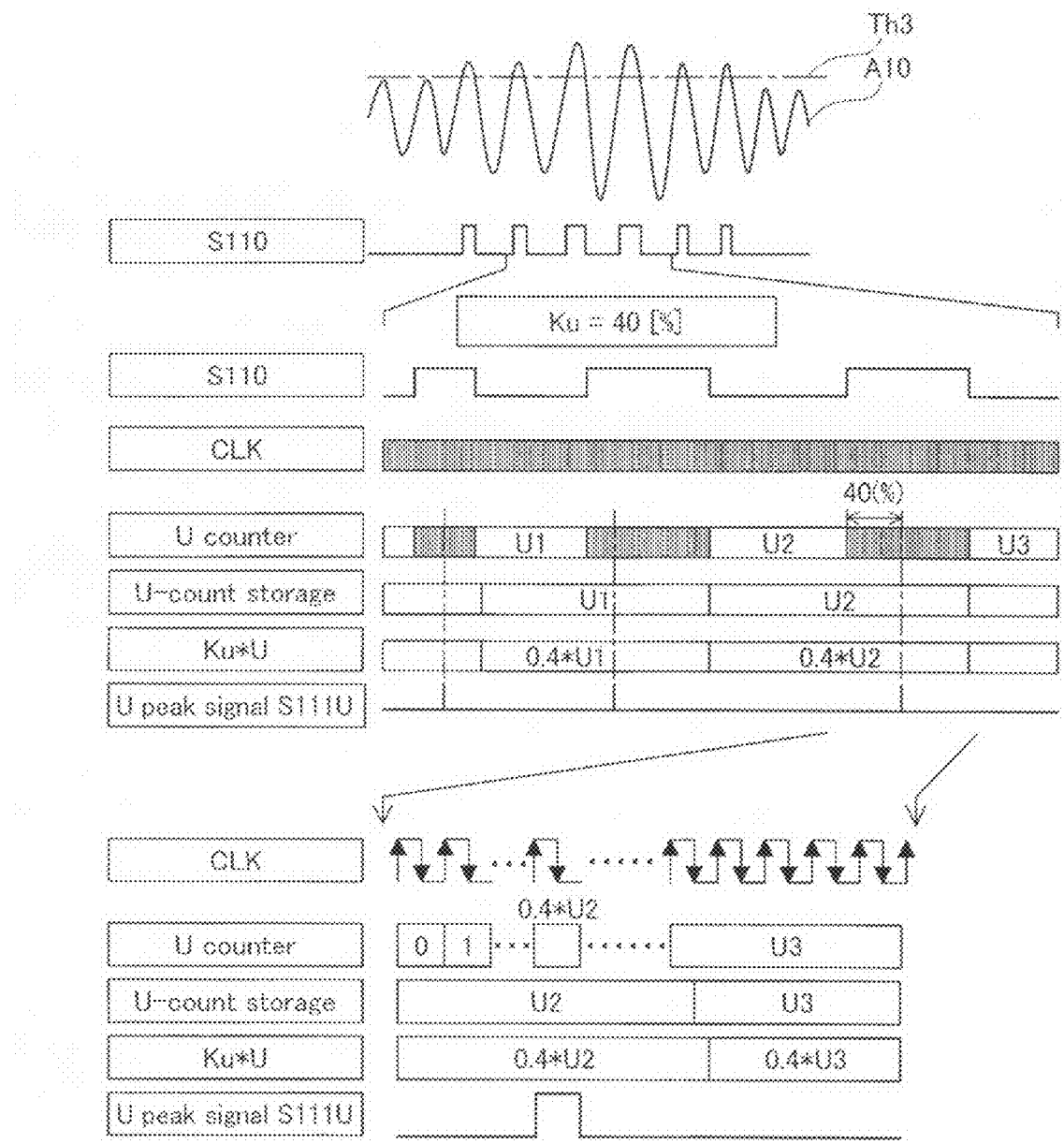
FIG. 5 is a timing chart showing the operation of the upper peak detection unit.

FIG. 5 is a timing chart showing the operation of the upper peak detection unit 300. The upper peak detection unit 300 operates as follows. First, the counter 320 receives the comparison signal S110, and sequentially counts the clock count in the period for which the input comparison signal S110 is at high level based on the clock signal CLK supplied from the controller 520, and outputs the obtained counter values to the comparator 370. Then, the counter 320 stores in the counter value storage 330 the counter value Ui (i is the cycle number) at the stage when the comparison signal S110 goes from high level to low level.

The coefficient value storage 340 stores the coefficient value Ku set by the CPU 30. The multiplication circuit 350 multiplies the counter value Ui stored in the counter value storage 330 and the coefficient value Ku stored in the coefficient value storage 340, and stores the obtained operation result in the operation result storage 360. With the examples in FIG. 4 and FIG. 5, Ku=0.4.

The comparator 370 generates the upper peak signal S111U. The comparator 370 compares the counter values sequentially input from the counter 320 with the operation result (=Ui×Ku) stored in the operation result storage 360, and when these match, sets the upper peak signal S111U to a high level for a specified period.

Note that the counter 320 correlates to the measurement unit in the claimed invention, the multiplication circuit 350 correlates to the calculation unit, and the comparator 370 correlates to the detection signal generator.

Figure 6:
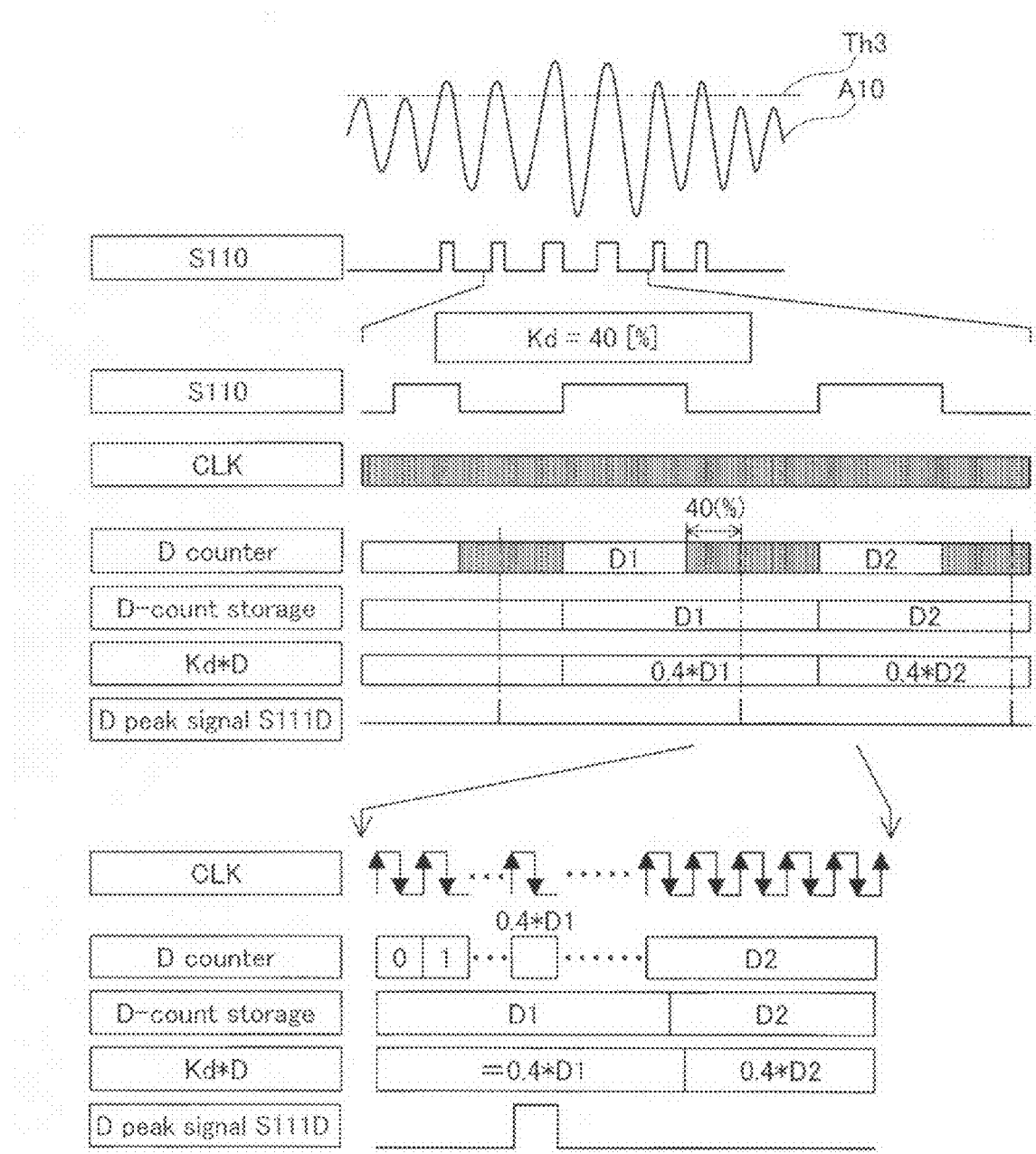
FIG. 6 is a timing chart showing the operation of the lower peak detection unit.

FIG. 6 is a timing chart showing the operation of the lower peak detection unit 400. The operation of the lower peak detection unit 400 is the same as the operation of the upper peak detection unit 300 except for the point of using an inverted signal of the comparison signal S110, so a detailed description is omitted here.

Following, before describing the specific phase comparison operation using this peak signal generator 200, there will be described a summary of how to determine the phase detection points in the first half of each cycle of the current signal A10 in a comparison example and in the embodiment.

B. DETERMINATION OF THE PHASE DETECTION POINT

Figure 10A:
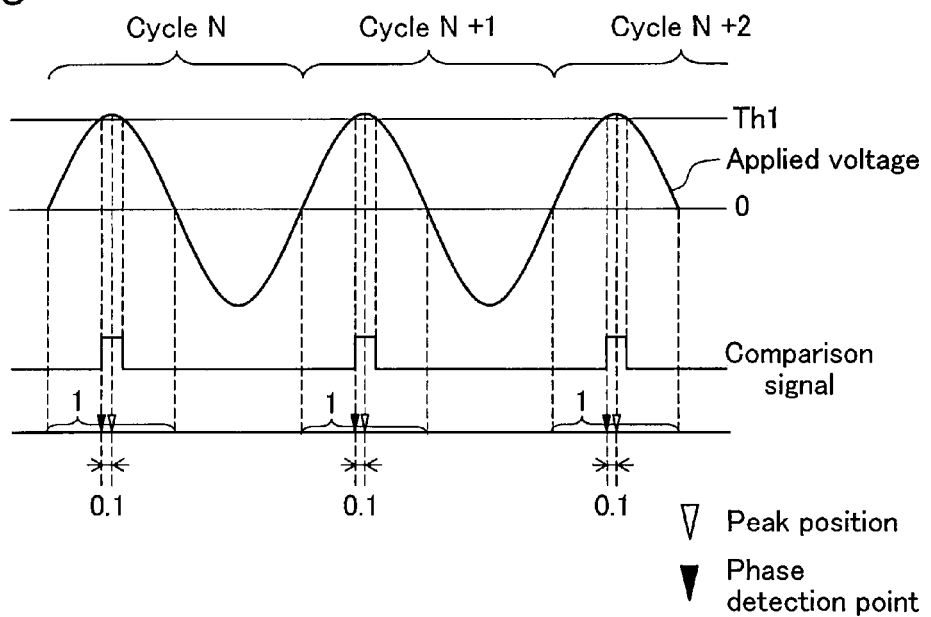
FIGS. 10A and 10B are explanatory diagrams showing the phase comparison method in a comparative example.
Figure 10B:
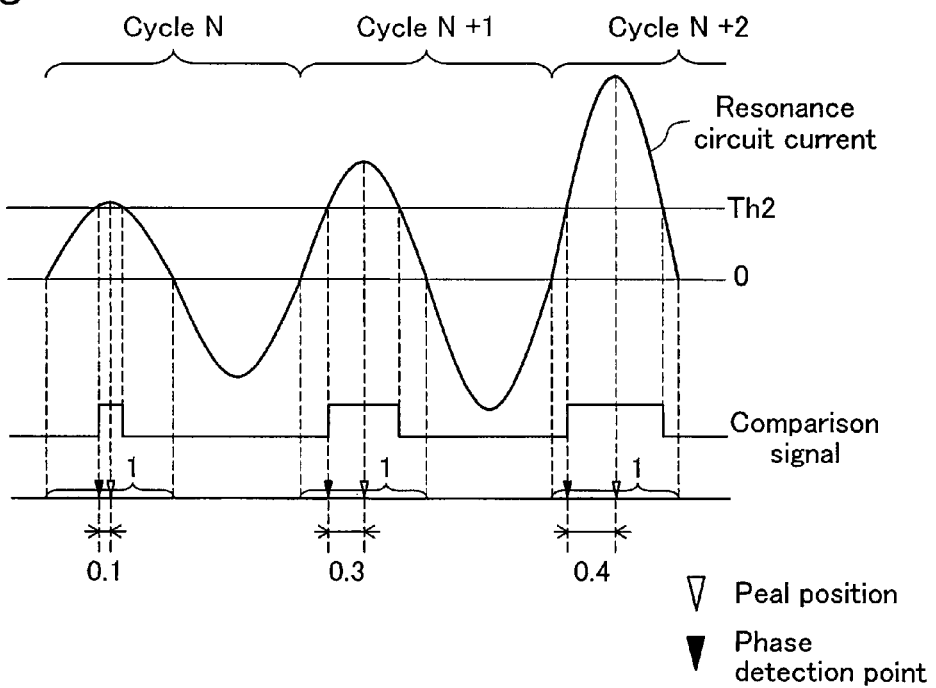

FIGS. 10A and 10B are explanatory diagrams showing the phase comparison method in a comparative example. FIG. 10A indicates the waveform of the voltage applied to the resonance circuit and the phase detection point, and FIG. 10B indicates the resonance circuit current waveform and the phase detection point. Note that in FIGS. 10A and 10B, the horizontal axis shows the elapse of time for cycle N, N+1, and part of cycle N+2, and the vertical axis shows the current value when the center of the amplitude is set to 0 level. Also, in FIGS. 10A and 10B, the white triangle marks indicate peak positions, and the black triangle marks indicate the position that is the reference for comparison of phases that is detected instead of the peak position (hereafter called the "phase detection point"). Note that the voltage and the current have the peak at both positive and negative polarities, but here, the discussion will proceed with peaks only on the positive side.

In FIG. 10A, a specified threshold value Th1 is set in advance in relation to the applied voltage, and when the applied voltage is equal to or greater than the threshold value Th1, a high level signal (hereafter called the comparison signal) is generated. Then, the rising edge of this comparison signal is detected and used as the phase detection point.

Meanwhile, as shown in FIG. 10B, a specified threshold value Th2 is set in advance in relation to the resonance circuit current as well, and as in FIG. 10A, a comparison signal is generated, and the rising edge of that comparison signal is detected and used as the phase detection point. Then, instead of the respective peak positions, the phase detection point of the applied voltage and that of the resonance circuit current are compared with each other, and the phase difference is detected accordingly.

There are the following problems with this phase comparison method described above.

When the applied voltage frequency is increased so as to approach the resonance frequency, as shown in FIG. 10B, the amplitude of the resonance circuit current gradually increases. As a result, for each cycle, with the length of the period from the start position (phase=0) to the ½ cycle position (phase=π) being defined as "1," the period from the peak position up to the phase detection point will be changed as shown in FIG. 10B, for example as in "0.1," "0.3," "0.4." Therefore, for the resonance circuit current, the relative position of the phase detection point to the actual peak position will change. Meanwhile, for the applied voltage, for each cycle, with the length of the period from the start position (phase=0) to the ½ cycle position (phase=π) being defined as "1," the period from the peak position to the phase detection point is fixed, for example, at "0.1" as shown in FIG. 10A. Therefore, for the applied voltage, the relative position of the phase detection point to the peak position is fixed.

Therefore, for the applied voltage and the resonance circuit current, when the phase difference is detected based on the respective phase detection points, the detected phase difference will be different from the correct phase difference obtained by comparing actual peak positions to each other. As a result, because it is not possible to detect the accurate phase difference, it is not possible to accurately control the applied voltage frequency, and it would not be possible to maintain stable lighting of the discharge lamp.

Figure 7:
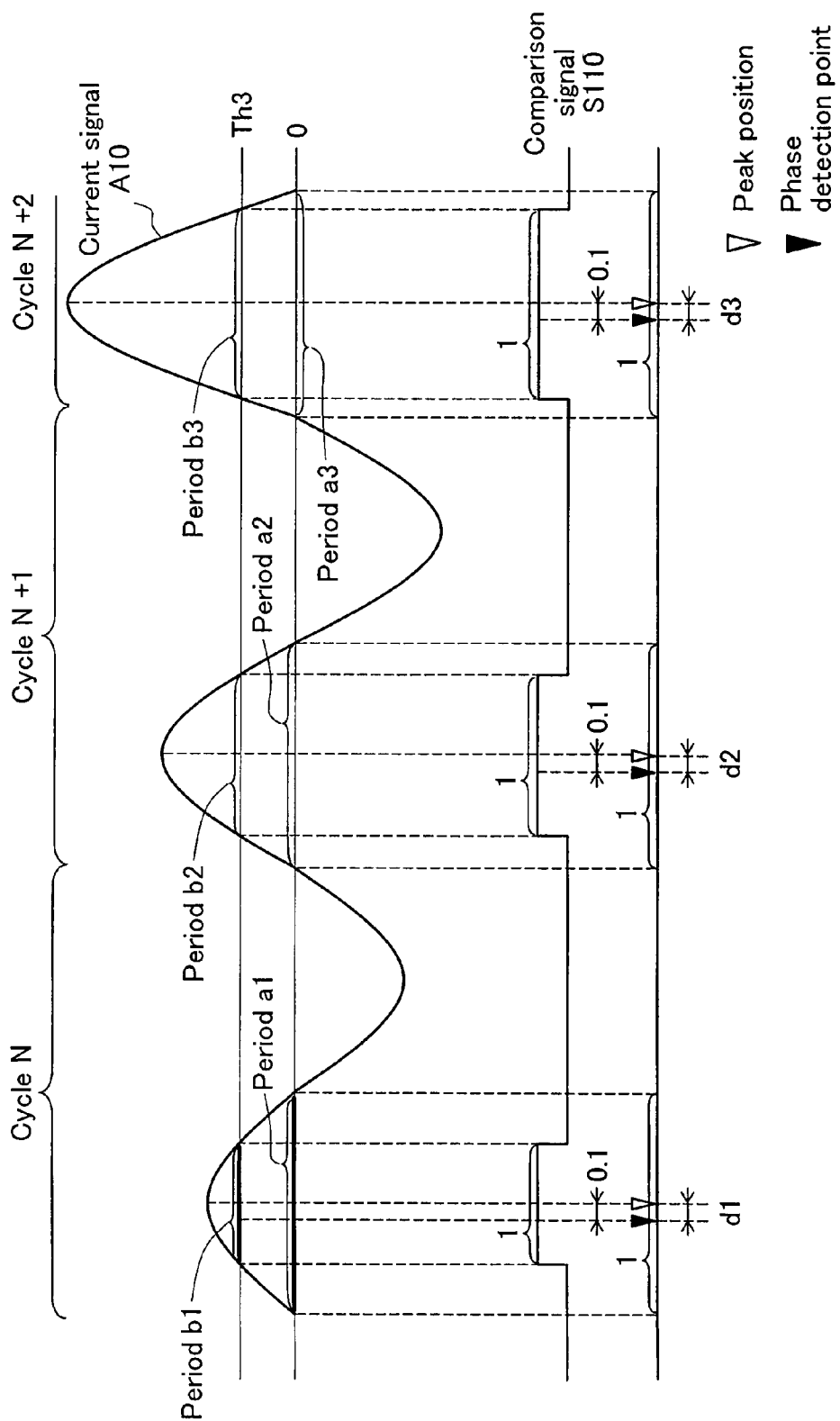
FIG. 7 is an explanatory drawing showing a summary of how to determine the phase detection point in the first half of each cycle of the current signal A10.

FIG. 7 is an explanatory drawing showing a summary of how to determine the phase detection point in the first half of each cycle of the current signal A10 in the embodiment. In FIG. 7, the upper part shows the waveform of the current signal A10, and the bottom part shows the comparison signal S110, the phase detection point, and the peak position. Note that in FIG. 7, the horizontal axis, the vertical axis, the white triangle marks, and the black triangle marks are respectively the same as those in FIGS. 10A and 10B, so their description is omitted here.

With cycle N (0 to 2π), the period a1 is the first half ½ cycle (0 to π), and the period b1 is the period for which the comparison signal S110 is at high level. Note that the periods a2 and b2 of cycle N+1 and the periods a3 and b3 of the cycle N+2 are defined in the same manner as the periods a1 and b1, so their description is omitted here.

From the fact that the current signal A10 is a sine wave, the peak position that is the center position (phase=π/2) of the period a1 and the center position of the period b1 match. The position offset by 0.1 from the center position of the period b1 where the value "0.1" is defined to be a ratio when the length of the period b1 is defined as "1" correlates to the position offset by d1 from the peak position during the period a1 where d1 is a pre-specified ratio when the length of the period a1 is defined as "1." Here, during the period b1, the position offset by 0.1 from the center position correlates to 20% before from the center position when the period from the start position of period b1 to the center position is defined to be 100%, and this position is close to the center position. Since this position is also close to the peak position for the period a1 as well, so the period d1 has a value close to 0.1.

Similarly, for the cycle N+1 as well, at period b2, the position offset by 0.1 from the center position when the length of the period b2 is defined as "1" correlates to a position offset by d2 from the peak position when the length of the period a2 is defined as "1" at period a2, and the value d2 is also close to 0.1. Also, for the cycle N+2 as well, similarly, the value d3 shown in FIG. 7 is close to 0.1.

In this way, for the period for which the comparison signal S110 is at high level, when the position offset by 0.1 from the center position, in other words, the position which is 20% before the center position, is made to be the phase detection point, at each cycle, the phase detection point is the position offset by about 0.1 from the upper peak position (phase=π/2), and the relative position to the upper peak position is almost fixed. The reason is that, as can be understood from FIG. 7 as well, as the resonance state is gradually approached, the length of the period bi (i is the cycle number) approaches the length of the period ai correlating to ½ the cycle, so the period di also approaches almost a fixed value (=0.1). In light of this, with this embodiment, the position offset by 0.1 from the center position of the period for which the comparison signal is S110 is at high level is set as the phase detection point.

For the phase detection point associated with the upper peak position of the sine wave signal A1, the rising position of the comparison signal S112 for each cycle may be set as the phase detection point. This is because the sine wave signal A1, similar to the applied voltage shown in FIG. 10A, does not have the amplitude change, so the relative position of the phase detection point to the upper peak position is fixed.

Note that the threshold value Th4 for the sine wave signal A1, similar to the threshold value Th1 shown in FIG. 10A, is set in advance so that the position offset by 0.1 from the upper peak position will become the phase detection position where the value "0.1" is defined so that the length of the ½ cycle (0 to π) is defined as "1." By working in this way, it is possible to compare the phase of the current signal A10 and the sine wave signal A1 based on the respective phase detection positions each having the same relative position to the upper peak position. As a result, when the respective phase detection points match, the respective upper peak positions also almost match, and the phases of the current signal A10 and the sine wave signal A1 also almost match.

In order to make the position that is 20% before the center position to be the phase detection point, it is possible to have the position correlating to 40% from the rising edge of the comparison signal S110 be the phase detection point, as shown in the formula (1) below, when the period for which the comparison signal S110 is at high level is defined as 100%:

$$(100\% - 20\%)/2 = 40\% \quad (1)$$

However, even when trying to determine the phase detection point for the cycle N+1 shown in FIG. 7, the length of the high level period b2 for the cycle N+1 is not known until the period b2 elapses, so it is also not possible to know the position correlating to 40% from the start of this period b2. In light of this, with this embodiment, using the period b1 which is the high level period for the previous cycle N, the period correlating to 40% of the period b1 from the start of the period b2 is determined as the phase detection point of the cycle N+1. The reason this is acceptable is because as the resonance state is approached, the length of the period bi does not fluctuate much, and it converges to about the same length.

Also, the coefficient value stored in the coefficient value storage 340 shown in FIG. 4 is set at the value indicating the length of the period from the rising edge of the comparison signal S110 till the phase detection point when the length of the high level period of the comparison S110 is defined as "1." As described previously, when the position correlating to 40% from the start of the high level period is used as the phase detection point, "0.4" is stored as the coefficient value. The above description is directed to the phase detection relating to the upper peak position, but the concept of the phase detection relating to the lower peak position is also the same.

C. PHASE COMPARISON OPERATION

The operation of generating the upper peak signal S111U of the current signal A10 will be described below with reference to FIG. 4 and FIG. 8.

Figure 8:
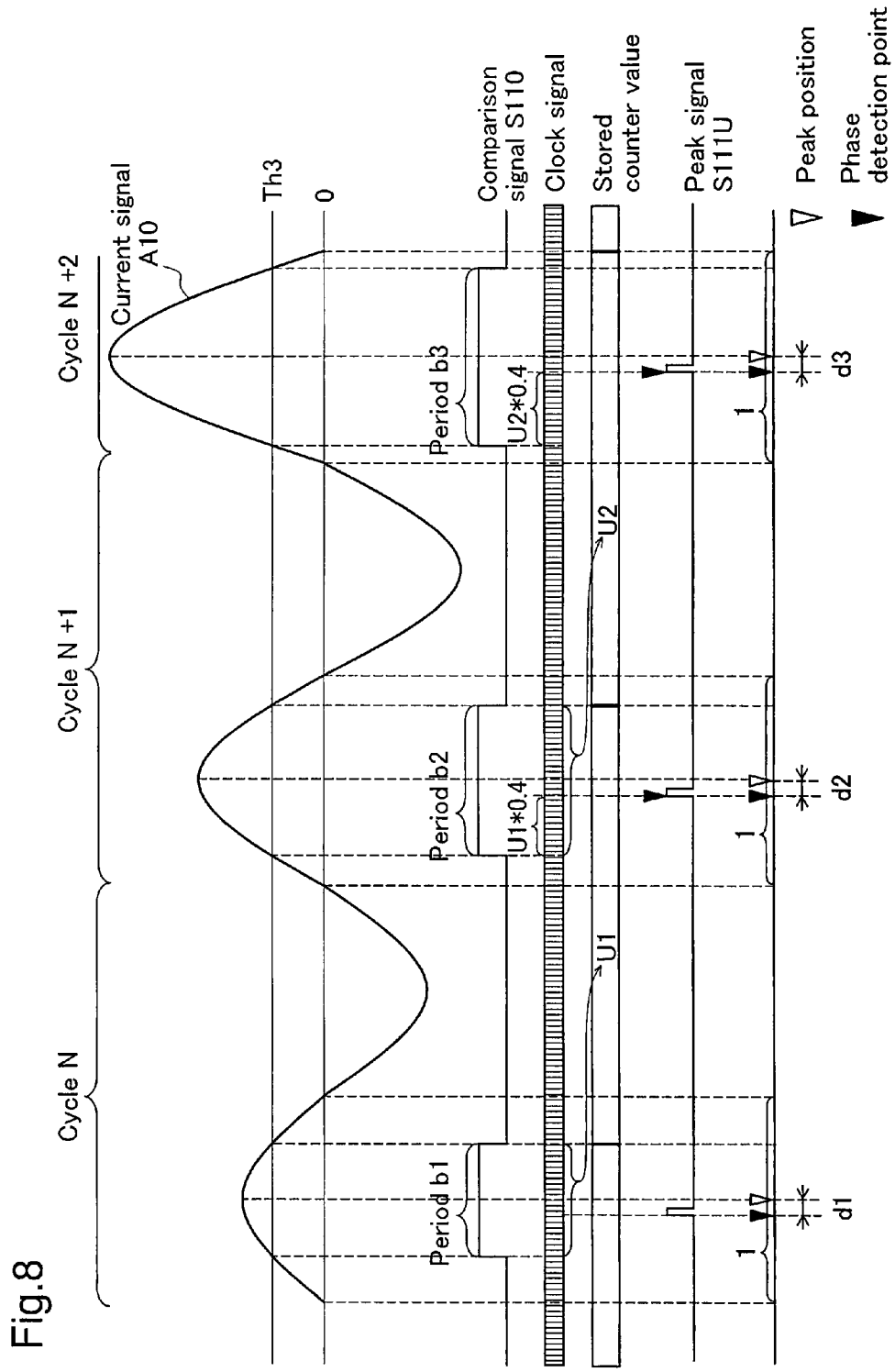
FIG. 8 is an explanatory drawing typically showing the operation of generating the upper peak signal S111U in the peak signal generator and the method of determining the phase detection point.

FIG. 8 is an explanatory drawing typically showing the operation of generating the upper peak signal S111U at the peak signal generator 200 and the method of determining the phase detection point. In FIG. 8, the upper part shows the waveform of the current signal A10, and the lower part shows the comparison signal S110, the clock signal output by the PLL circuit 510 shown in FIG. 4, the counter value Ui stored in the counter value storage 330, the upper peak signal S111U, the phase detection point, and the peak position. Note that in FIG. 8, the horizontal axis, the vertical axis, the white triangle marks, the black triangle marks, the cycles N to N+2, and the periods b1 to b3 are respectively the same as those in FIG. 7, so their description is omitted here. Also, as shown in the farthest bottom of FIG. 8, the periods from the peak position to the phase detection point for cycles N to N+2, with the length of the ½ cycle (0 to π) being defined as 1, are defined as d1 to d3.

Assume here that the cycle N ends and the cycle N+1 starts. At this time, for the previous cycle N, the counter 320 shown in FIG. 4 counts the clock count for the period b1 shown in FIG. 8, and the obtained counter value U1 is stored in the counter value storage 330, and a value "U1*0.4" obtained by the multiplication circuit 350 multiplying this counter value U1 and the coefficient value "0.4" stored in the coefficient value storage 340 is stored in the operation result storage 360.

When the cycle N+1 starts and the current signal A10 reaches the threshold value Th3, the comparison signal S110 rises to high level, and the counter 320 starts to count the clock pulses. Then, the comparator 370 compares the counter value counted by the counter 320 and the value "U1*0.4" stored in the operation result storage 360, and at the stage when the counter value becomes "U1*0.4," the upper peak signal S111U is risen to high level for a specified period. Then, the comparison signal S110 goes from high level to low level, and at the stage that the period b2 ends, the counter 320 writes the new counter value U2 over the previous counter value U1 in the counter value storage 330. Then, the multiplication circuit 350 multiplies this counter value U2 and the coefficient value "0.4" stored in the coefficient value storage 340, and the obtained "U2*0.4" is written over the previous value "U1*0.4" in the operation result storage 360.

Meanwhile, the comparison signal S112 for the sine wave signal A1 is generated by comparing the threshold value Th4 and the sine wave signal A1 in the voltage comparator 224, and it is the same signal as the comparison signal shown in FIG. 10A. However, to say this more precisely, the comparison signal S112 generated in the voltage comparison unit 224 is a signal substantially showing both the upper peak and the lower peak of the sine wave signal A1. Therefore, the actual comparison signal S112 is a signal that generates the high level with twice the frequency of the comparison signal shown in FIG. 10A. The OR circuit 530 of the peak detection unit 200 generates the peak signal S111 by taking the logical sum of the upper peak signal S111U and the lower peak signal S111D.

The phase comparison unit 230 shown in FIG. 3 receives this peak signal S111 and the comparison signal S112, and compares their respective phase detection points. Here, the phase comparison unit 230 detects the rising edge of the peak signal S111 for the current signal A10 and uses that as the phase detection point. As a result, for the first half of the cycle N+1, the position of "U1*0.4" from the start of the period b2 is the phase detection point, and for the latter half of cycle N+2, the position of "U2*0.4" from the start of the period b3 is the phase detection point. This is the same for the other cycles.

As shown in FIG. 8, with the adjacent cycles, the change in the high level period of the comparison signal S110 is small, and in particular, the amplitude of the current signal A10 is almost fixed for the state with the frequency of the sine wave signal A1 near the resonance frequency, so the high level period is almost the same. Therefore, when length of the ½ cycle (0 to π) is defined as "1," the periods d1 to d3 are approximately "0.1," and the relative position of each phase detection point to the upper peak position is almost fixed. The same is also true regarding the lower peak positions.

For the sine wave signal A1, the rising edge of the comparison signal S112 is detected and used as the phase detection point, so for each phase detection point, when the length of each ½ cycle (0 to π) is set to "1," the position offset by 0.1 from the peak position that occurs for each ½ cycle is fixed, and the relative position in relation to the peak position is fixed.

By working in this way, the phase comparator 230 compares phase detection points with each other for which the relative position to the peak position is almost fixed. As a result, the phase comparator 230 accurately detects the phase difference of the current signal A10 and the sine wave signal A1 even if the amplitude of the current signal A10 changes.

As described above, with the waveform generator 100, the phase detection point of the current signal A10 is not the rising position of the comparison signal S110 but rather the position offset by "0.1" from the peak position when the high level period of the comparison signal S110 is "1." As a result, this phase detection point, when the length of each ½ cycle (0 to π) is "1," is the position offset by about "0.1" from the peak position that occurs for each ½ cycle, and for each ½ cycle, the relative position to the peak position of the phase detection point is almost fixed. Meanwhile, for the sine wave signal A1, from the fact that the amplitude does not change, the relative position to the peak position of the phase detection point is fixed. Therefore, by comparing the phase at the respective phase detection points with the current signal A10 and the sine wave signal A1, it is possible to compare the phases of phase detection points with each other that have almost fixed relative positions to the peak positions.

As a result, the phase comparator 230 is able to almost accurately detect the phase difference of the current signal A10 and the sine wave signal A1 even when the amplitude of the current signal A10 changes, and it is possible for a phase difference signal P1 indicating an almost accurate phase difference to be output to the sine wave generator 240. Because of this, the sine wave generator 240 is able to suitably adjust the frequency of the sine wave signal A1, and possible to do stable maintaining of the lighting of the discharge lamp 10. Also, with this embodiment, it is possible to execute phase comparison of the two signals A1 and A10 for each ½ cycle, so it is possible to match both phases more quickly. Specifically, with the example of the discharge lamp described above, it is possible to more quickly approach the resonance state.

D. VARIATION EXAMPLES

Note that this invention is not limited to the embodiments and aspects described above, but can be implemented with various aspects in a range that does not stray from the key points, and variations such as the following are possible.

D1. Variation Example 1

With the embodiment described above, the signal A1 which is the waveform of the voltage applied to the resonance unit 150 is described as a sine wave, but is not limited to a sine wave, and may be other waveforms. In this case, the coefficient value is determined according to each waveform, and stored in the coefficient value storage 340 shown in FIG. 3. FIG. 9 shows exemplary waveforms of various application signals, and the coefficient value (the Ku value in FIG. 4) for the respective waveforms. With the sawtooth wave 1, when from the cycle start position to the 1 cycle position is defined as 1, the position offset by 0.8 from the start position is the peak position. Therefore, by setting Ku=0.7 (and Kd=0.1) as the coefficient value, it is possible to use a position relatively close to the peak position as the phase detection point. Similarly, with the sawtooth wave 2, Ku=0.2 (and Kd=0.6), and with a triangular wave and sine wave, the peak position is offset by 0.5, so it is possible to determine Ku=0.1 (and Kd=0.7) for the sawtooth wave 2, and Ku=Kd=0.4 for the triangular and sine wave such that the phase detection points will be close to the respective peak positions. By working in this way, even when the waveform changes, it is possible to perform the phase comparison to determine the phase detection point close to the peak position.

Instead of fixing the coefficient value for each waveform, it is possible to set a permissible range of the coefficient value Ku, for example, between 0.7 and 0.8 for the sawtooth wave 1 in advance, and to use any of the values in this range as the coefficient value. This is also applicable to the coefficient value Kd for lower peak detection. Note that as can be understood from the examples described above, it is preferable for the total of the upper peak coefficient value Ku and the lower peak coefficient value Kd to be a fixed value not dependent on the waveform.

D2. Variation Example 2

With the embodiments described above, at each cycle, with the length of the high level period of the comparison signal S110 being defined as "1," the position offset by "0.1" from the center of this high level period is set as the phase detection point for the upper peak, but the ratio may be set to values other than "0.1." To set the phase detection point closer to the upper peak position, it is possible to use a position offset by "0.05" from the center as the phase detection point, for example. In this case, the phase detection point correlates to the position that is 10% before the center of the high level period of the comparison signal S110 where the first half of the high level period being defined as 100%, and when calculated in the same way as formula (1) noted above, "45%" is obtained. Therefore, with the comparison signal S110 high level period being defined as 100%, it is possible to determine the position correlating to 45% from the rising position of the comparison signal S110 as the phase detection point, and because of that, it is possible to set "0.45" as the coefficient value Ku and to change the threshold value Th4 in relation to the sine wave signal A1 so that each phase detection position is a position offset by 0.05 from each peak position. The same is also true for the lower peak phase detection point.

Note that with the embodiments described above, the specified phase difference of the current signal A10 and the sine wave signal A1 is set as 0, but it is possible to set the phase difference of these signals to any specific value by changing the values of the coefficient values Ku and Kd, and to maintain this phase difference. This can be done, for example, by changing the coefficient values Ku and Kd from "0.4" to "0.45," and by not changing the threshold value Th4 in relation to the sine wave signal A1. In this case, the phase detection point for the current signal A10 is fixed at a position offset by about "0.05" from the peak position with the ½ cycle (0 to π) being defined as "1," while in contrast to this, the phase detection point for the sine wave signal A1 is fixed at a position offset by "0.1" from the peak position as with the embodiments described above. Therefore, a phase difference correlating to almost 0.05 is maintained for each cycle with the current signal A10 and the sine wave signal A1.

D3. Variation Example 3

The above embodiments are directed to the liquid crystal projector 1000, but this invention is not limited to the application to the liquid crystal projector 1000 and can also be used for a DLP projector (DLP is a registered trademark). Also, this is not limited to a projector, and can also be used for an illumination device that performs lighting control of a discharge lamp using a resonance circuit such as a vehicle illumination device (headlights) or the like. Also, the present invention may be applied to discharge control other than lamps, and is not limited to a discharge lamp, but can also be used for a control circuit that controls the operation of an actuator such as a piezoelectric motor or the like using a resonance circuit. Furthermore, it may be applied to resonance control as well, and can be used for atomic clocks, laser oscillation control circuits, wireless tuning control circuits and the like.

D4. Variation Example 4

With the embodiments described above, the phase of the current of the resonance circuit and the phase of the sine wave signal A1 are compared, but this present invention is not limited to being applied only when doing phase comparison. With a control circuit that controls the operation of the discharge lamp described above, an actuator or the like, when it is necessary to detect the peak position of current for a resonance circuit, this invention can be applied to detect the phase detection point of the embodiments described above as the peak position. By working in this way, it is possible to detect a position for which the relative position to the actual peak position is fixed as a nominal peak position, so even when the amplitude of the current at the resonance circuit changes, it is possible to detect the peak position within a specified margin of error.

Note that instead of the current at the resonance circuit as described above, it is also possible to apply this invention to the analog signal of current or the like for which the amplitude can change. By working in this way, it is possible to detect the peak position of this analog signal within a specified margin of error.

Also, the present invention can be used as a peak detection circuit for any analog signal having periodicity (called "peak detection subject signals") such as a light volume detection signal, a temperature detection signal, a vibration level detection signal, a electric power detection signal or the like.

D5. Variation Example 5

With the embodiments described above, the current value of the resonance circuit is detected by the current sensor, and as the current signal A10 undergoes phase comparison with the sine wave signal A1, but instead of the current value, it is also possible to detect the voltage value applied to the actual resonance unit 150 to output an analog detection signal, and to do a phase comparison of this analog signal with the sine wave signal A1.

What is claimed is:

1. A specific phase position detection circuit comprising:
a detector that detects first and second temporal positions which have respective desired phase offsets from an upper peak position and a lower peak position of an analog signal having periodicity, and
a phase signal generator that outputs a phase signal indicating the detected first and second temporal positions, wherein the detector comprises:
a reference position detection unit configured to detect, as first and second reference positions, the first and second temporal positions for which a signal level of the analog signal matches a predetermined threshold value;
a first phase detection unit configured to generate a first detection signal indicating a first specific phase position in a first half of each cycle of the analog signal based on the first and second reference positions;
a second phase detection unit configured to generate a second detection signal indicating a second specific phase position in a latter half of each cycle of the analog signal based on the first and second reference positions; and
a logical operation unit configured to generate a phase signal indicating the first and second specific phase positions by taking logical sum of the first and second detection signals,
wherein the first and second phase detection units each includes:
a measuring unit configured to measure a length of a reference period based on the first and second reference positions;
a calculation unit configured to calculate a partial period which has a fixed ratio in relation to the reference period; and
a detection signal generator configured to generate the first or second detection signal indicating the first or second specific phase position based on the first and second reference positions and the partial period.

2. A specific phase position detection circuit comprising:
a detector that detects first and second temporal positions which have respective desired phase offsets from an upper peak position and a lower peak position of an analog signal having periodicity, and
a phase signal generator that outputs a phase signal indicating the detected first and second temporal positions, wherein the detector comprises:
a reference position detection unit configured to respectively detect, as first and second reference positions, the first and second temporal positions for which a signal level of the analog signal matches a first predetermined threshold value for each cycle of the analog signal;
a first phase detection unit configured to generate a first detection signal indicating a first specific phase position in a first half of each cycle of the analog signal based on the first and second reference positions;
a second phase detection unit configured to generate a second detection signal indicating a second specific phase position in a latter half of each cycle of the analog signal based on the first and second reference positions; and a logical operation unit configured to generate a phase signal indicating the first and second specific phase positions by taking logical sum of the first and second detection signals, wherein the first and second phase detection units each includes:

a measuring unit configured to measure, as a reference period, a length of time from the first reference position to the next second reference position, or a length of time from the second reference position to the next first reference position;

a calculation unit configured to calculate a partial period which has a fixed ratio in relation to the reference period measured in the previous cycle for each cycle of the analog signal; and a detection signal generator configured to detect, as the first or second specific phase position, a temporal position offset by the partial period calculated by the calculation unit from the first or second reference position detected in the current cycle, and to generate the first or second detection signal indicating the first or second specific phase position.

3. A specific phase position detection method for detecting temporal positions which have a specific phase as specific phase positions for each half cycle of an analog signal, comprising the steps of:

(a) detecting, as first and second reference positions, two temporal positions for which a signal level of the analog signal matches a first predetermined threshold value for each cycle of the analog signal;

(b) generating a first detection signal indicating a first specific phase position in a first half of each cycle of the analog signal based on the first and second reference positions;

(c) generating a second detection signal indicating a second specific phase position in a latter half of each cycle of the analog signal based on the first and second reference positions; and (d) generating a phase signal indicating the first and second specific phase positions by taking logical sum of the first and second detection signals, wherein generating a first detection signal and generating a second detection signal each includes the steps of:

measuring, as a reference period, a length of time from the first reference position to the next second reference position, or a length of time from the second reference position to the next first reference position;

calculating a partial period which has a fixed ratio in relation to the reference period measured in the previous cycle for each cycle of the analog signal; and detecting, as the first or second specific phase position, a temporal position offset by the partial period from the first or second reference position detected in the current cycle.

* * * * *